United States Patent
Choi et al.

(10) Patent No.: US 8,836,864 B2
(45) Date of Patent: Sep. 16, 2014

(54) DISPLAY APPARATUS AND CONTROL METHOD THEREOF FOR DISPLAYING A PICTURE-IN-PICTURE SCREEN

(75) Inventors: Jin-wook Choi, Suwon-si (KR); Hyun-sig Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 31 days.

(21) Appl. No.: 13/232,276

(22) Filed: Sep. 14, 2011

(65) Prior Publication Data

US 2012/0162517 A1    Jun. 28, 2012

(30) Foreign Application Priority Data

Dec. 27, 2010  (KR) .................. 10-2010-0135672

(51) Int. Cl.
| | |
|---|---|
| H04N 5/44 | (2011.01) |
| H04N 5/45 | (2011.01) |
| H04N 9/76 | (2006.01) |
| H04N 5/50 | (2006.01) |
| G06F 3/01 | (2006.01) |
| H04N 21/4402 | (2011.01) |
| H04N 21/431 | (2011.01) |
| H04N 21/422 | (2011.01) |

(52) U.S. Cl.
CPC ..... *H04N 21/422* (2013.01); *H04N 21/440263* (2013.01); *H04N 21/4316* (2013.01)
USPC ........... 348/565; 348/569; 348/601; 348/734; 345/157

(58) Field of Classification Search
USPC ......... 348/565, 588, 601, 734, 564, 569, 561; 345/157, 158, 168, 173, 629; 725/38–43
See application file for complete search history.

(56) References Cited

U.S. PATENT DOCUMENTS

| | | | |
|---|---|---|---|
| 5,554,980 A | 9/1996 | Hashimoto et al. | |
| 5,606,374 A * | 2/1997 | Bertram | 725/37 |
| 5,801,785 A * | 9/1998 | Crump et al. | 348/563 |
| 6,195,692 B1 * | 2/2001 | Hsu | 725/110 |
| 6,449,018 B1 * | 9/2002 | Yokoyama | 348/565 |
| 6,510,553 B1 * | 1/2003 | Hazra | 725/87 |
| 7,209,179 B2 * | 4/2007 | Dai et al. | 348/552 |
| 7,496,277 B2 * | 2/2009 | Ackley et al. | 386/248 |
| 2003/0208571 A1 | 11/2003 | Yik et al. | |
| 2004/0201780 A1 * | 10/2004 | Kim | 348/565 |
| 2007/0216807 A1 * | 9/2007 | Otsuka et al. | 348/565 |
| 2009/0109339 A1 * | 4/2009 | Ackley et al. | 348/565 |

OTHER PUBLICATIONS

Communication, dated May 13, 2014, issued by the European Patent Office in counterpart European Application No. 11177467.5.

* cited by examiner

*Primary Examiner* — Victor Kostak
(74) *Attorney, Agent, or Firm* — Sughrue Mion, PLLC (57) ABSTRACT

A display apparatus and a control method thereof are provided. The display apparatus includes a first signal processor which processes a first image; a second signal processor which processes a second image; a display unit which displays the processed first image on a main screen and the processed second image on a picture-in-picture (PIP) screen having a predetermined size and at least partially overlapping with the first image; a receiver which receives a pointer signal corresponding to a user's selection; and a controller which determines which one of the first image and the second image shows a pointer corresponding to the received pointer signal located thereon, and controls the second signal processor so that a result from performing an operation corresponding to a location of the pointer on the second image can be processed and displayed on the PIP screen if the pointer is located on the second image.

46 Claims, 5 Drawing Sheets

DISPLAY APPARATUS AND CONTROL METHOD THEREOF FOR DISPLAYING A PICTURE-IN-PICTURE SCREEN

CROSS-REFERENCE TO RELATED APPLICATION

This application claims priority from Korean Patent Application No. 10-2010-0135672, filed on Dec. 27, 2010 in the Korean Intellectual Property Office, the disclosure of which is incorporated herein by reference in its entirety.

BACKGROUND

1. Field

Apparatuses and methods consistent with the exemplary embodiments relate to a display apparatus capable of displaying a picture-in-picture (PIP) screen and a control method thereof, and more particularly to a display apparatus, which can control an image displayed on a PIP screen through a pointing device, and a control method thereof.

2. Description of the Related Art

A PIP function processes a plurality of video signals to be simultaneously displayed in one screen and is therefore convenient for a user. Through the PIP function, the plurality of video signals are input and processed to be displayed as a main screen and a sub screen, respectively. If a user executes the PIP function while viewing on the main screen, an image of a sub screen is displayed as being overlapped with a certain region of an image displayed on the main screen.

However, a conventional display apparatus allows control based on a user's selection with regard to an image displayed on the main screen, but does not allow control based on a user's selection with regard to an image displayed on the sub screen. That is, conventionally, control of an image displayed on the sub screen is possible only after the image displayed on the sub screen is switched to be displayed on the main screen.

SUMMARY

Accordingly, one or more exemplary embodiments provide a display apparatus supporting a PIP function and a control method thereof, in which an image displayed on a PIP screen can be controlled in accordance with a user's selection without switching between a main screen and a sub screen.

The foregoing and/or other aspects may be achieved by providing a display apparatus comprising: a first signal processor which processes a first image; a second signal processor which processes a second image; a display unit which displays the processed first image on a main screen and displays the processed second image on a picture-in-picture (PIP) screen having a predetermined size and at least partially overlapping with the first image at a region; a receiver which receives a pointer signal corresponding to a user's selection; a controller which determines which one of the first image and the second image shows a pointer corresponding to the received pointer signal located thereon, and controls the second signal processor so that a result from performing an operation corresponding to a location of the pointer on the second image can be processed and displayed on the PIP screen if the pointer is located on the second image.

The controller may determine that the pointer is located on the second image if the pointer is located in the region at least partially overlapping with the first image.

The second signal processor may process a third image corresponding to the result from performing the operation corresponding to the location of the pointer on the second image so the third image is adjusted to fit the predetermined size of the PIP screen in an image adjustment.

The image adjustment in the second signal processor may comprise at least one of adjustment of display resolution and scaling.

The pointer signal may be received from a pointing device connected to the receiver.

The display apparatus may further comprise a communication unit which communicates with an external device, wherein the pointer signal is received from a pointing device connected to the external device.

The pointing device may comprise at least one of a mouse, a touch pad, a touch screen provided on the display unit, a pointing remote controller and a keyboard.

The controller may determine whether the pointer signal is received from the keyboard, and if it is determined that the pointer signal is received from the keyboard, the controller may assign a key code corresponding to characteristics of the keyboard, generate a keyboard packet about the location of the pointer on the second image, and transmit the keyboard packet to the second signal processor.

If it is determined that the pointer signal is not received from the keyboard, the controller may determine coordinates of the pointer on the second image, generate a packet about the coordinates, and transmit the packet to the second signal processor.

Another aspect may be achieved by providing a method of controlling a display apparatus, the method comprising: processing a first image displayed on a main screen; processing a second image displayed on a picture-in-picture (PIP) screen having a predetermined size and the second image is at least partially overlapping with the first image in a region; receiving a pointer signal corresponding to a user's selection; determining which one of the first image and the second image shows a pointer corresponding to the received pointer signal located thereon; and processing a result from performing an operation corresponding to a location of the pointer on the second image displayed on the PIP screen if the pointer is located on the second image.

The determining may comprise determining that the pointer is located on the second image if the pointer is located in the region at least partially overlapping with the first image.

The processing the second image displayed on the PIP screen may comprise processing a third image corresponding to the result from performing an operation corresponding to the location of the pointer on the second image so the third image is adjusted to fit the predetermined size of the PIP screen in an image adjustment.

The processing the third image so the third image is adjusted may comprise adjusting at least one of adjustment of display resolution and scaling for the third image corresponding to the result from performing the operation.

The receiving the pointer signal may comprise receiving the pointer signal from a pointing device connected to a receiver of the display apparatus.

The receiving the pointer signal may comprise receiving the pointer signal from a pointing device connected to an external device communicating with the display apparatus.

The pointing device may comprise at least one of a mouse, a touch pad, a touch screen provided on the display unit, a pointing remote controller and a keyboard.

The method may further comprise determining whether the pointer signal is received from the keyboard, and assigning a key code corresponding to characteristics of the keyboard and generating a keyboard packet about the location of the pointer on the second image, if it is determined that the pointer signal is received from the keyboard.

The method may further comprise determining coordinates of the pointer on the second image and generating a packet about the coordinates, if it is determined that the pointer signal is not received from the keyboard.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
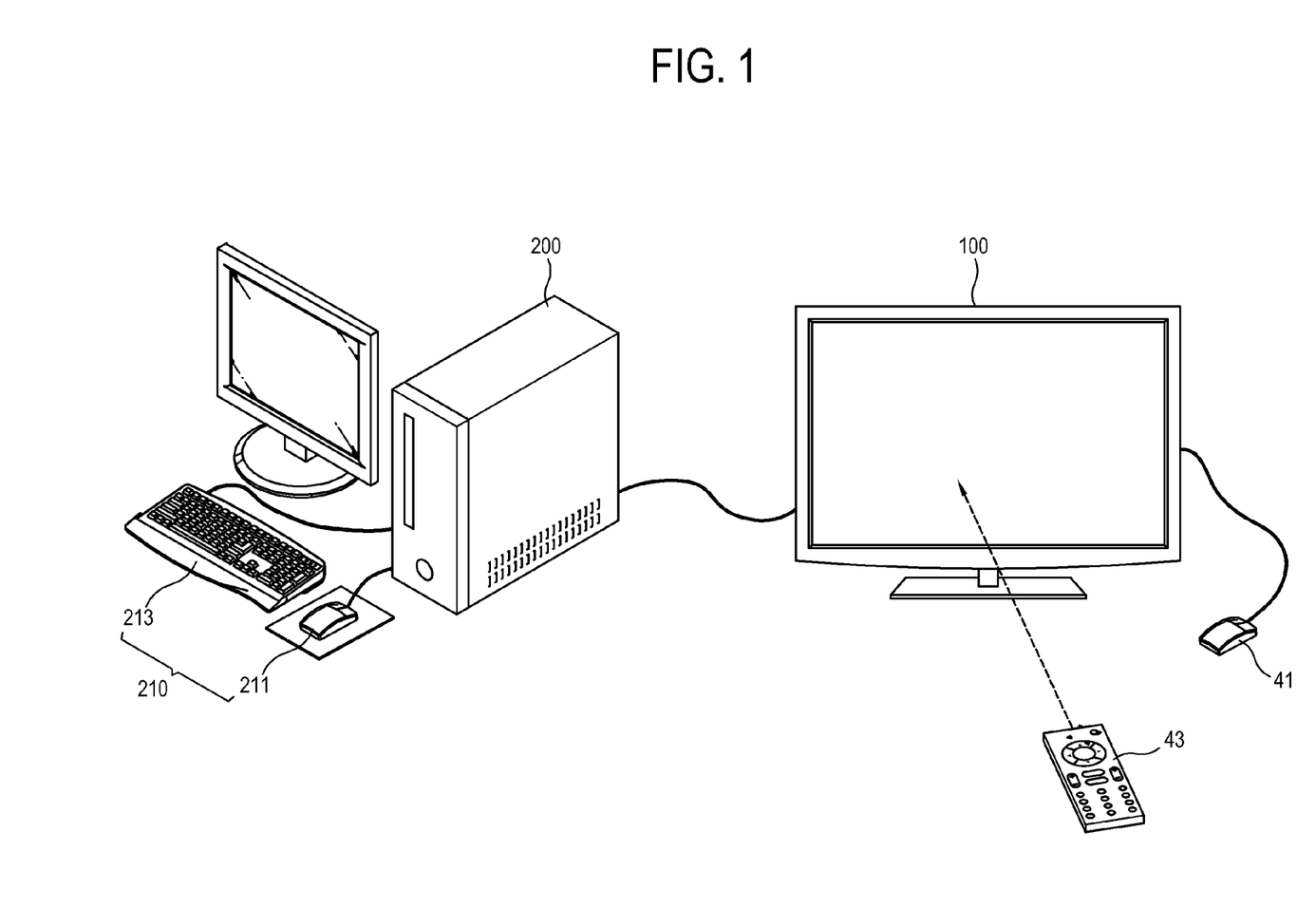
FIG. 1 is a schematic diagram of a system including a display apparatus according to an exemplary embodiment and an external device.

FIG. 1 is a schematic diagram of a system including a display apparatus according to an exemplary embodiment and an external device.

As shown in FIG. 1, a system includes a display apparatus 100 and an external device 200. The display apparatus 100 may be a digital television (DTV), an Internet protocol television (IPTV) or the like TV. Thus, the display apparatus 100 may receive a video signal from various video sources, such as a computer (not shown) capable of generating a video signal, a central processing unit (CPU, not shown), and a graphic card (not shown) and providing it locally, a server (not shown) capable of providing a video signal through a network, a transmitter (not shown) of a broadcasting station capable of transmitting a broadcasting signal through airwaves or a cable, etc. Thus, the display apparatus 100 may further include a receiver (not shown) capable of receiving a video signal from outside the display apparatus 100.

The receiver (not shown) may wirelessly receive a radio frequency (RF) signal transmitted from a broadcasting receiver, or may receive a video signal based on standards of composite video, component video, super video, Syndicat des Constructeurs des Appareils Radiorécepteurs et Téléviseurs (SCART), high definition multimedia interface (HDMI), etc. At this time, the receiver (not shown) may further include an antenna (not shown) and/or a tuner (not shown) for tuning to a broadcasting channel.

The display apparatus 100 supports a PIP function. The PIP function may be implemented by a certain key input of a remote controller 43 capable of transmitting a control signal corresponding to a user's selection to the display apparatus 100.

The display apparatus 100 may include an application capable for performing a predetermined function. The application may include various applications corresponding to various functions, such as a web browser, an MP3 player, a photo viewer, etc. Thus, the display apparatus 100 may include an operating system (OS) for driving the application. The OS may include a universal serial bus (USB) driver, and a USB interface (not shown) corresponding to the USB driver may be provided in the display apparatus 100. The USB interface may be an example of a pointer receiver 40 (refer to FIG. 2). Thus, a mouse 41, a keyboard or the like pointing device may be directly connected to the display apparatus 100 through the USB interface, so that the mouse, the keyboard, etc. can control the display apparatus 100 in accordance with a user's selection.

Also, the display apparatus 100 may be internally provided with a touch screen on the display unit 30, may be externally provided with a touch pad (not shown), and may include a pointing remote controller 43, all of which can control the display apparatus 100 in accordance with a user's selection.

The display apparatus 100 may communicate with an external device 200 through a communication unit 60 (refer to FIG. 2), and may receive a video signal from the external device 200 through the communication unit 60.

The external device 200 may include any type of video processing apparatus capable of transmitting a video signal to the display apparatus 100, e.g., a personal computer (PC), such as a desktop computer, a laptop computer, a net-book computer, a tablet PC, etc., a game console, a personal video recorder PVR, a Blu-ray disc (BD) and/or digital versatile disc (DVD) player, etc.

In the case that the PC is used as the external device 200, a pointer signal generated by a pointing device such as a keyboard, a mouse, etc. connected to the PC may be transmitted to the display apparatus 100, so that the display apparatus 100 can be controlled by the pointer signal. For example, it is detected whether the pointer signal generated by the pointing device 210, such as the mouse 211, the keyboard 213, etc. connected to the PC 200 is input. If the pointer signal is detected, information about the kind, coordinates, key status, etc. of the pointing device is packetized and transmitted to the pointer receiver 40 (refer to FIG. 2) of the display apparatus 100 so that the input pointer signal can appropriately input characteristics in the form of a preset USB input signal. In this case, the pointer receiver 40 was achieved in the form of the USB interface.

Figure 2:
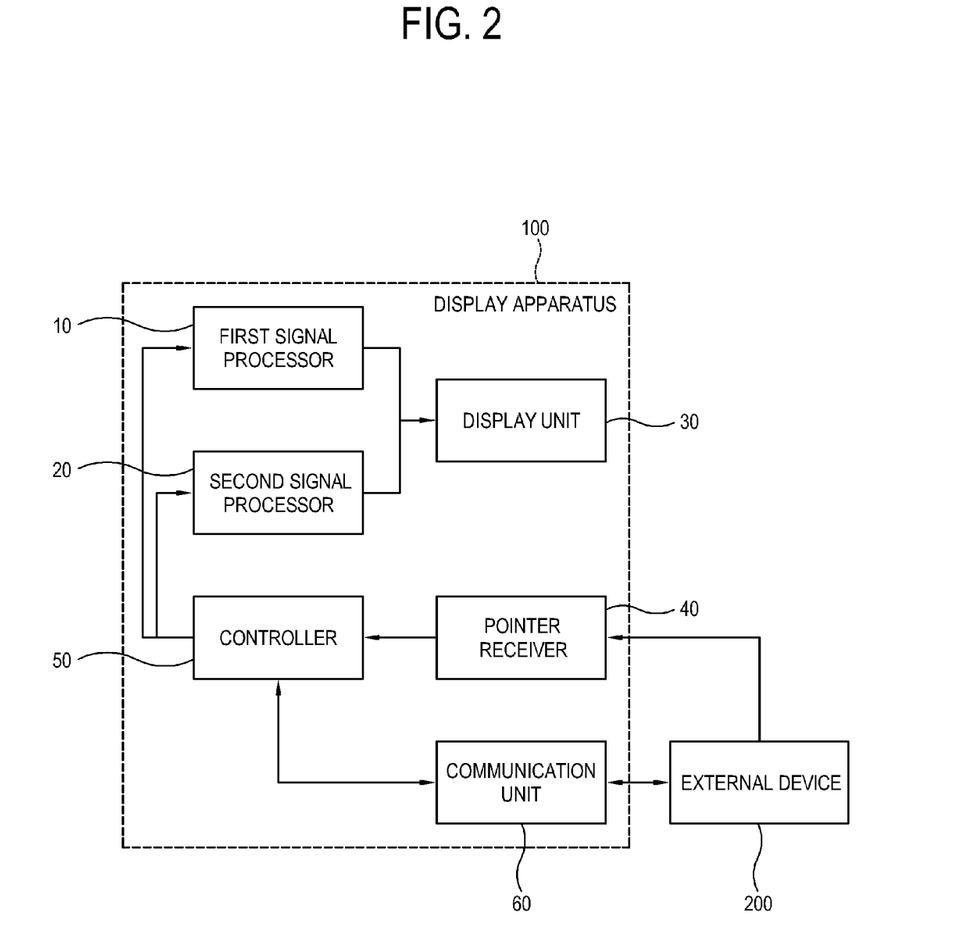
FIG. 2 is a control block diagram of the display apparatus of FIG. 1.

The display apparatus 100 analyzes the pointer signal received from the external device 200, and thus the OS of the display apparatus 100 can operate as a driver for the pointing device, thereby transmitting a control signal corresponding to the pointer signal to a first signal processor 10 or a second signal processor 20 (refer to FIG. 2). The first signal processor 10 or the second signal processor 20 (refer to FIG. 2) performs signal processing in accordance with the received control signal, and transmits it to the display unit 30 (refer to FIG. 2). In this exemplary embodiment, communication based on the USB interface was described as an example of the transmission of the pointer signal between the external device 200 and the pointer receiver 40 (refer to FIG. 2), but is not limited thereto. Alternatively, communication based on various communication interfaces such as an RS-232C interface, an Institute of Electrical and Electronics Engineers (IEEE)-1394 interface, etc. may be possible.

The display apparatus 100 according to an exemplary embodiment will be described in more detail with reference to FIG. 2. FIG. 2 is a control block diagram of the display apparatus 100 of FIG. 1. As shown therein, the display apparatus 100 includes a first signal processor 10, a second signal processor 20, a display unit 30, a pointer receiver 40, a communication unit 60, and a controller 50 controlling them.

The first signal processor 10 processes a first image and transmits it to the display unit 30, so that the display unit 30 can display the first image on a main screen. The second signal processor 20 processes a second image and transmits it to the display unit 30, so that the display unit 30 can display the second image as a PIP screen at least partially overlapped with the first image and having a predetermined size.

As described with reference to FIG. 1, the display apparatus 100 may receive a plurality of video signals from various sources, and a user can select whether an image will be displayed on the main screen or the PIP screen. Also, the display apparatus 100 may include an application, such as a web browser, an MP3 player, a photo viewer, etc., and display an image generated by execution of the application on the main screen or the PIP screen. For example, a broadcasting signal received from a broadcasting transmitter (not shown) may be displayed on the main screen, and a web page browsed by the web browser provided in the display apparatus 100 may be displayed on the PIP screen.

Further, the video signal received from the external device 200 connected through the communication unit 60 may be displayed on the main screen, and a photo viewer application provided in the display apparatus 100 may be executed and displayed on the PIP screen. Thus, whether to display the plurality of video signals on the main screen or the PIP screen is determined in accordance with a user's selection. The controller 50 controls the first signal processor 10 to process the first video signal corresponding to the main screen and controls the second signal processor 20 to process the second video signal corresponding to the PIP screen on the basis of the determination.

The second signal processor 20 applies image adjustment to the second image with regard to display resolution and/or scaling, etc. so as to make the second image fit a predetermined size of the PIP screen, thereby displaying the second image on the PIP screen.

The first signal processor 10 and the second signal processor 20 may perform various video processes preset with respect to a video signal. There is no limit to the kind of processes. For example, the processes may include decoding and encoding according to various video formats, de-interlacing, frame fresh rate conversion, scaling, noise reduction for image quality enhancement, detail enhancement, line scanning, etc.

The display unit 30 displays the first image processed by the first signal processor 10 on the main screen, and the second image processed by the second signal processor 20 on the PIP screen. Here, the PIP screen is at least partially overlapped with the first image displayed on the main screen, and has a predetermined size. Alternatively, the PIP screen may be entirely overlapped with the first image displayed on the main screen. The size and location of the PIP screen may be varied depending on a manufacturer or user's selection.

The display unit 30 includes a display panel (not shown) for displaying the image, and a panel driver (not shown) for driving the display panel. The display panel may include a liquid crystal display (LCD) panel with a liquid crystal layer, a organic light emitting diode (OLED) panel with an organic light emitting layer, a plasma display panel, etc.

The pointer receiver 40 receives a pointer signal corresponding to a user's selection. The pointer receiver 40 may be achieved in the form of the USB interface. In this case, the pointer receiver 40 may directly connect with the pointing device provided with the USB interface, such as the mouse 41 (refer to FIG. 1), the keyboard (not shown), etc., and may directly receive a pointer signal corresponding to a user's selection. Also, the pointer receiver 40 may receive a pointer signal based on a user's touch from the pointing device, such as a touch pad, a touch screen, etc. Further, the pointer receiver 40 may receive a pointer signal from the pointing device, such as a pointing remote controller 43 (refer to FIG. 2) provided with a sensor. Thus, the pointer receiver 40 may include an interface corresponding to the pointing device for generating a pointer signal.

Also, the pointer receiver 40 may receive a pointer signal generated by the pointing device 210 (refer to FIG. 1), such as the keyboard, the mouse, etc. connected to the external device 200. At this time, the pointer receiver 40 may be achieved by a communication interface for communicating with the external device 200, which may include a USB interface, an RS-232C interface, an IEEE-1394 interface, etc. Thus, the external device 200 detects input of a pointer signal generated by the pointing device 210, and analyzes the pointer signal when receiving the pointer signal, so that necessary information about the kind of pointing device, input coordinates, a key status, etc. corresponding to the pointing signal can be packetized in accordance with the kind of communication interface and transmitted to the pointer receiver 40.

The controller 50 determines which one of the first image and the second image shows the pointer of the pointer signal received through the pointer receiver 40 located thereon. As a result of determination, if the pointer is located on the second image, the controller 50 controls the second signal processor 20 so that a result from performing an operation corresponding to the location of the pointer on the second image can be processed to be displayed on the PIP screen.

The controller 50 first determines what kind of pointing devices transmits the pointer signal on the basis of the pointer signal received by the pointer receiver 40, and then determines whether the pointer signal is located on the second image. Thus, the controller 50 analyzes the received pointer signal and determines whether it is received from the keyboard or not. If the pointer signal is received from the keyboard, the controller 50 determines whether the pointer based on the pointer signal is located on the second image. If the pointer signal is not received from the keyboard, it is determined whether the signal is received from the mouse, the touch pad, the touch screen or the pointing remote controller, and then it is determined whether the pointer signal is located on the second image.

The controller 50 can intuitively determine the location of the pointer. That is, the second image displayed on the PIP screen may be entirely or at least partially overlapped with the first image displayed on the main screen. If the pointer is located in a region where the second image is displayed being overlapped with the first image, the controller 50 determines that the pointer is located on the second image.

If it is determined that the pointer is located on the second image and the pointer input is based on the keyboard, the controller 50 reassigns a key code corresponding to keyboard characteristics and generates a keyboard packet corresponding to the location of the pointer on the second image to thereby transmit it to the second signal processor 20. If it is determined that the pointer is located on the second image and the location of the pointer is represented as coordinates by the mouse, the touch pad, the touch screen or the pointing remote controller, the controller 50 ascertains the coordinates of the pointer and generates a packet about the coordinates to thereby transmit it to the second signal processor 20. The controller 50 controls the second signal processor 20 to process a result from performing the operation corresponding to the received keyboard packet or the packet about the coordinates to be displayed on the PIP screen.

Figure 3:
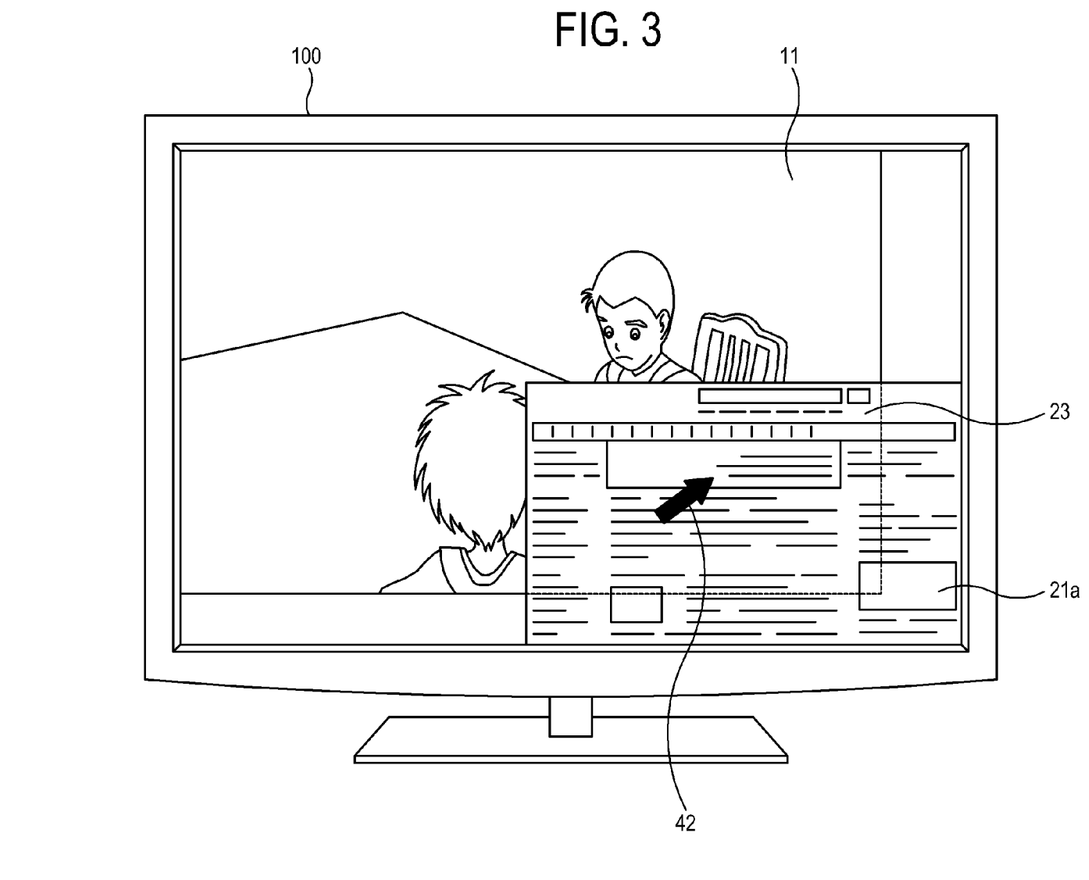
FIGS. 3 and 4 illustrate control operations of the display apparatus of FIG. 1.
Figure 4:
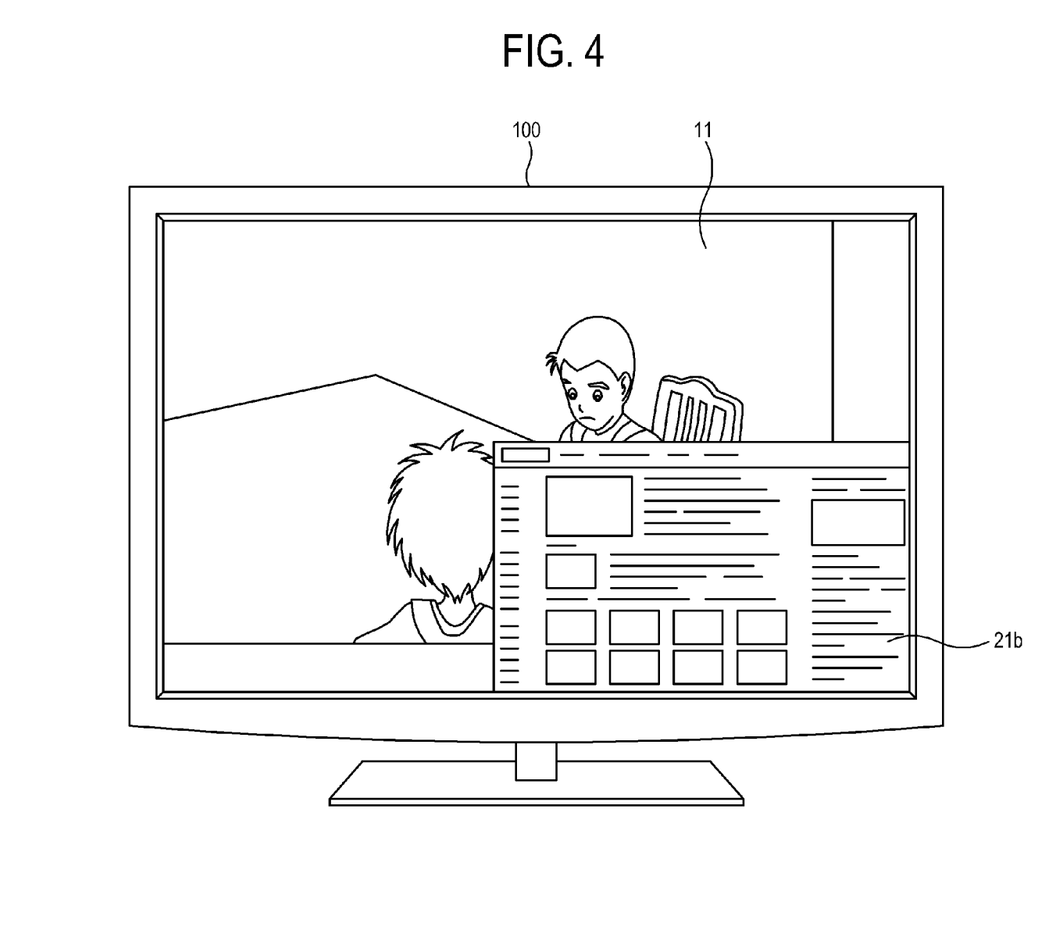

FIGS. 3 and 4 illustrate control operations of the display apparatus of FIG. 1.

In the display unit 30 of the display apparatus 100, a first image corresponding to a moving picture 11 is displayed on the main screen, and a second image corresponding to a web page 21a is displayed on the PIP screen. Further, a region 23 of the web page 21a is displayed being overlapped with the moving picture 11. If a pointer signal of the pointer 42 corresponding to a user's selection is received through the pointer receiver 40, it is first determined whether the pointer signal of the pointer 42 is received from the keyboard. In this exemplary embodiment, it will be assumed that the pointer signal of the pointer 42 is received from the mouse. The controller 50 determines the kind of pointing device corresponding to the pointer 42 and then determines the location of the pointer 42 from the pointer signal. FIG. 3 illustrates that the pointer 42 is located in a region 23 where the moving picture 11 and the web page 21a are overlapped with each other, but the controller 50 determines that the pointer signal of the pointer 42 is a signal for controlling the web page 21a.

In a conventional display apparatus, if the pointer is located in a region where the PIP screen and the main screen are overlapped with each other, it is determined that the pointer signal is a signal for controlling not the PIP screen but the main screen. Therefore, a user has to switch the image of the PIP screen to the image of the main screen in order to control the PIP screen.

On the other hand, according to an exemplary embodiment, if the pointer is located in a region 23 where the PIP screen and the main screen are overlapped, it is determined that the pointer signal is a signal for controlling the PIP screen, thereby resulting in convenience to a user.

Thus, the controller 50 determines the pointer signal of the pointer 42 is a signal for controlling the web page 21a. Then, the controller 50 analyzes the coordinates indicated by the pointer 42, generates the data packet for the mouse with regard to the coordinates, transmits it to the second signal processor 20, and controls the second signal processor 20 to display a result from performing an operation corresponding to the packet on the PIP screen. FIG. 4 illustrates the result. In FIG. 3, if the pointer 42 points to one of a plurality of link items contained in the web page 21a displayed on the PIP screen, i.e., the pointer 42 is over the one of the plurality of link items, the controller 50 controls the second signal processor 20 to display the web page 21b corresponding to the pointed link item as the PIP screen.

At this time, the second signal processor 20 adjusts a display resolution of the web page 21b corresponding to the link item and/or performs scaling so as to make the web page 21b fit a predetermined size of the PIP screen. Thus, a result from performing an operation corresponding to a user's selection is displayed on the PIP screen without switching the image displayed on the PIP screen to the image of the main screen. In other words, a user does not have to switch the web page from the PIP screen to the main screen in order to control the item of the web page displayed on the PIP screen.

Figure 5:
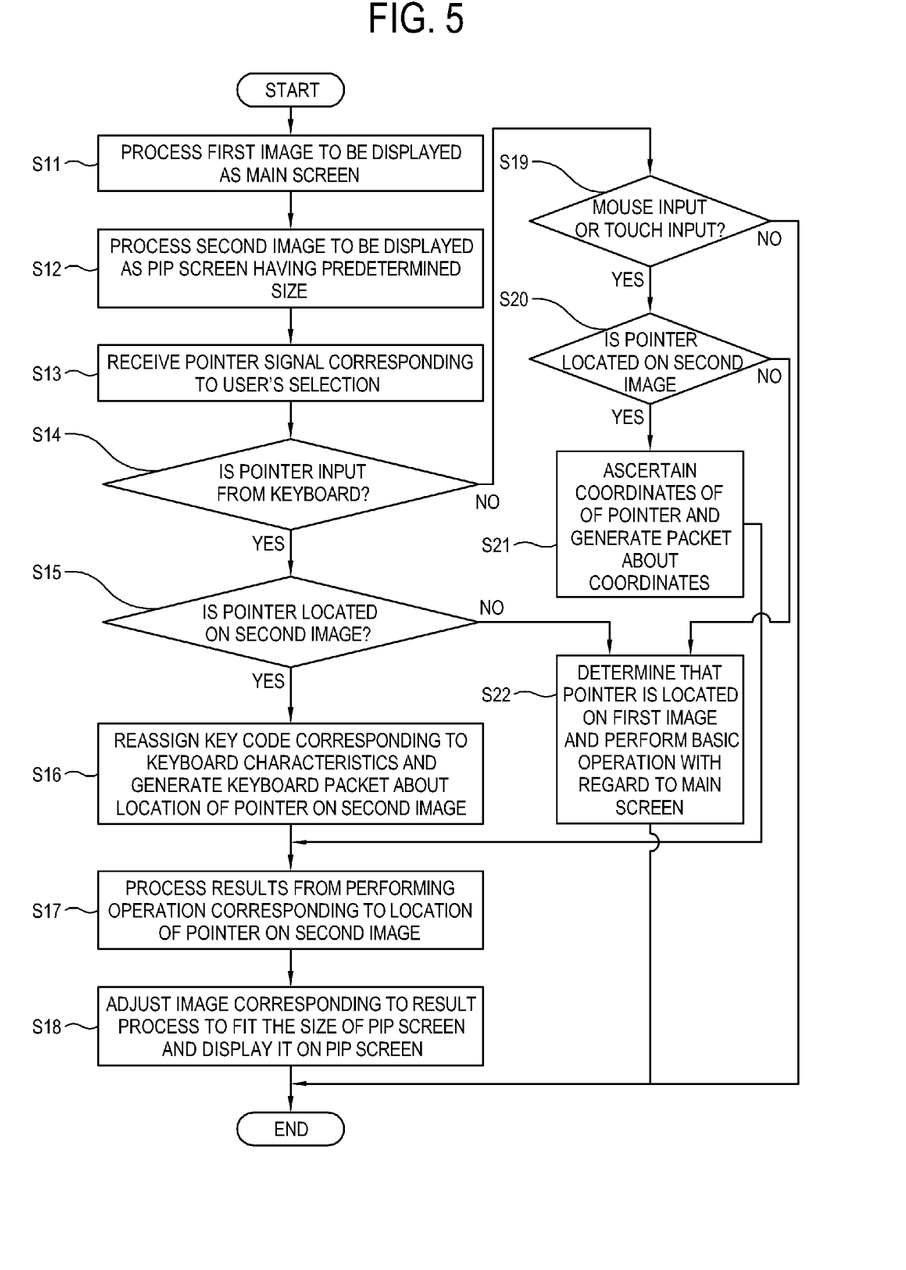
FIG. 5 is a control flowchart of the display apparatus of FIG. 1.

FIG. 5 is a control flowchart of the display apparatus of FIG. 1.

A first image is processed to be displayed on the main screen at operation S11, and a second image is processed to be displayed on a PIP screen having a predetermined size at least partially overlapped with the first image at operation S12. If a pointer signal corresponding to a user's selection is received at operation S13, it is determined whether the pointer signal is received from the keyboard at operation S14. If the pointer signal is received from the keyboard, it is ascertained whether the pointer based on the pointer signal is located on the second image at operation S15.

If the pointer is located on the second image, the controller 50 reassigns a key code corresponding to the keyboard characteristics, generates a keyboard packet about the location of the pointer on the second image, and transmits it to the second signal processor 20 at operation S16. If the pointer based on the pointer signal is not located on the second image at operation S15, it is determined that the pointer is located on the first image, thereby performing a basic operation about the main screen at operation S22.

If the pointer signal is not received from the keyboard at operation S14, it is determined whether the pointer signal is received from the mouse or based on touch input through a touch panel or a touch screen at operation S19. If the pointer signal is received from the mouse or based on the touch input, it is determined whether the pointer based on the pointer signal is located on the second image at operation S20. If the pointer is located on the second image, the coordinates of the pointer are ascertained and a packet about the coordinates is generated and transmitted to the second signal processor 20 at operation S21. If the pointer based on the pointer signal is not located on the second image, it is determined that the pointer is located on the first image, thereby performing a basis operation about the main screen at operation S22.

If the pointer is located in a region where the first image and the second image are overlapped with each other, the controller 50 determines that the pointer is located on the second image.

Under control of the controller 50, the second signal processor 20 processes a result from performing an operation corresponding to the location of the pointer on the second image on the basis of the received keyboard packet or the received packet about the coordinates at operation S17, and performs display resolution adjustment and/or scaling for the size of the PIP screen so that an image corresponding to the result can be displayed on the PIP screen at operation S18.

As apparent from the above description, there are provided a display apparatus supporting a PIP function and a control method thereof, in which an image displayed on a PIP screen can be controlled in accordance with a user's selection without requiring switching between a main screen and a sub screen.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A display apparatus comprising:
a first signal processor which processes a first image;
a second signal processor which processes a second image;
a display unit which displays the processed first image on a main screen and displays the processed second image on a picture-in-picture (PIP) screen which is at least partially overlapping with the first image;
a receiver which receives a pointer signal corresponding to a pointer displayed on the display unit; and
a controller which determines whether the pointer is located on the main screen or the PIP screen, and when the controller determines that the pointer is located on the PIP screen, displays a result from performing an operation corresponding to the determined location of the pointer in the PIP screen without receiving a user command for selecting the PIP screen.

2. The display apparatus according to claim 1, wherein the controller determines that the pointer is located on the second image if the pointer is located in a region at least partially overlapping with the first image.

3. The display apparatus according to claim 2, wherein the second signal processor processes a third image corresponding to a result from performing an operation corresponding to the location of the pointer on the second image so the third image is adjusted to fit a predetermined size of the PIP screen in an image adjustment.

4. The display apparatus according to claim 3, wherein the image adjustment in the second signal processor comprises at least one of adjustment of display resolution and scaling.

5. The display apparatus according to claim 1, wherein the pointer signal is received from a pointing device connected to the receiver.

6. The display apparatus according to claim 5, wherein the pointing device comprises at least one of a mouse, a touch pad, a touch screen provided on the display unit, a pointing remote controller and a keyboard.

7. The display apparatus according to claim 6, wherein the controller determines whether the pointer signal is received from the keyboard, and
if it is determined that the pointer signal is received from the keyboard, the controller assigns a key code corresponding to characteristics of the keyboard, generates a keyboard packet about the location of the pointer on the second image, and transmits the keyboard packet to the second signal processor.

8. The display apparatus according to claim 7, wherein if it is determined that the pointer signal is not received from the keyboard, the controller determines coordinates of the pointer on the second image, generates a packet about the coordinates, and transmits the packet to the second signal processor.

9. The display apparatus according to claim 1, further comprising a communication unit which communicates with an external device,
wherein the pointer signal is received from a pointing device connected to the external device.

10. The display apparatus according to claim 9, wherein the pointing device comprises at least one of a mouse, a touch pad, a touch screen provided on the display unit, a pointing remote controller and a keyboard.

11. The display apparatus according to claim 10, wherein the controller determines whether the pointer signal is received from the keyboard, and
if it is determined that the pointer signal is received from the keyboard, the controller assigns a key code corresponding to characteristics of the keyboard, generates a keyboard packet about the location of the pointer on the second image, and transmits the keyboard packet to the second signal processor.

12. The display apparatus according to claim 11, wherein if it is determined that the pointer signal is not received from the keyboard, the controller determines coordinates of the pointer on the second image, generates a packet about the coordinates, and transmits the packet to the second signal processor.

13. The display apparatus according to claim 1, wherein the second image comprises a web page having a plurality of link items, and in response to receiving the control command with the pointer located on the second image, another web page corresponding to one of the link items selected via the received control command is displayed in the PIP screen.

14. The display apparatus according to claim 1, wherein the first image comprises an image based on a received broadcasting signal, and the second image comprises a first web page browsed by a web browser, and
wherein when the pointer is located in a region having a predetermined web address on the first web page, a second web page corresponding to the predetermined web address is displayed in the PIP screen.

15. A method of controlling a display apparatus, the method comprising:
processing a first image displayed on a main screen;
processing a second image displayed on a picture-in-picture (PIP) screen which is at least partially overlapping with the first image;
receiving a pointer signal corresponding to a pointer being displayed;
determining whether the pointer is located on the main screen or the PIP screen; and
when the determining indicates that the pointer is located on the PIP screen, displaying a result from performing an operation corresponding to the determined location of the pointer in the PIP screen without receiving a user command for selecting the PIP screen.

16. The method according to claim 15, wherein the determining comprises determining that the pointer is located on the second image if the pointer is located in a region at least partially overlapping with the first image.

17. The method according to claim 16, wherein the processing the second image displayed on the PIP screen comprises processing a third image corresponding to a result from performing an operation corresponding to the location of the pointer on the second image so the third image is adjusted to fit a predetermined size of the PIP screen in an image adjustment.

18. The method according to claim 17, wherein the processing the third image so the third image is adjusted comprises adjusting at least one of adjustment of display resolution and scaling for the third image corresponding to the result from performing the operation.

19. The method according to claim 15, wherein the receiving the pointer signal comprises receiving the pointer signal from a pointing device connected to a receiver of the display apparatus.

20. The method according to claim 19, wherein the pointing device comprises at least one of a mouse, a touch pad, a touch screen provided on the display unit, a pointing remote controller and a keyboard.

21. The method according to claim 20, further comprising determining whether the pointer signal is received from the keyboard, and
assigning a key code corresponding to characteristics of the keyboard and generating a keyboard packet about the location of the pointer on the second image, if it is determined that the pointer signal is received from the keyboard.

22. The method according to claim 21, further comprising determining coordinates of the pointer on the second image and generating a packet about the coordinates, if it is determined that the pointer signal is not received from the keyboard.

23. The method according to claim 15, wherein the receiving the pointer signal comprises receiving the pointer signal from a pointing device connected to an external device communicating with the display apparatus.

24. The method according to claim 23, wherein the pointing device comprises at least one of a mouse, a touch pad, a touch screen provided on the display unit, a pointing remote controller and a keyboard.

25. The method according to claim 24, further comprising determining whether the pointer signal is received from the keyboard, and assigning a key code corresponding to characteristics of the keyboard and generating a keyboard packet about the location of the pointer on the second image, if it is determined that the pointer signal is received from the keyboard.

26. The method according to claim 25, further comprising determining coordinates of the pointer on the second image and generating a packet about the coordinates, if it is determined that the pointer signal is not received from the keyboard.

27. The method according to claim 15, wherein the first image comprises an image based on a received broadcasting signal, and the second image comprises a first web page browsed by a web browser, and
wherein when the pointer is located in a region having a predetermined web address on the first web page, a second web page corresponding to the predetermined web address is displayed in the PIP screen.

28. A method of controlling a display apparatus, the method comprising:
processing a first image displayed on a main screen;
processing a second image displayed on a picture-in-picture (PIP) screen which is at least partially overlapping with the first image;
receiving a pointer signal corresponding to a pointer being displayed;
determining whether the pointer corresponding to the received pointer signal is located in the main screen or the PIP screen; and
when the determining indicates that the pointer is located on the PIP screen, displaying a result from performing an operation corresponding to the determined location of the pointer in the PIP screen without receiving a user command for selecting the PIP screen.

29. The method according to claim 28, wherein the determining comprises determining that the pointer is located on the second image if the pointer is located in a region at least partially overlapping with the first image.

30. The method according to claim 29, wherein the processing the second image displayed on the PIP screen comprises processing a third image corresponding to a result from performing an operation corresponding to the location of the pointer on the second image so the third image is adjusted to fit a predetermined size of the PIP screen in an image adjustment.

31. The method according to claim 28, wherein the first image comprises an image based on a received broadcasting signal, and the second image comprises a first web page browsed by a web browser, and
wherein when the pointer is located in a region having a predetermined web address on the first web page, a second web page corresponding to the predetermined web address is displayed in the PIP screen.

32. A television system comprising:
a pointing device; and
a television apparatus including a first signal processor which processes a first image, a second signal processor which processes a second image, a display unit which displays the processed first image on a main screen and displays the processed second image on a picture-in-picture (PIP) screen which at least partially overlaps with the first image, and an interface unit which receives, from the pointing device, information associated with a pointer displayed on the display unit,
wherein a plurality of user-selectable items are associated with and displayed within the second image, and
the television determines whether the pointer is located on the main screen or the PIP screen and when the television determines that the pointer is located on the PIP screen, displays a result from performing an operation corresponding to one of the user-selectable items corresponding to the determined location of the pointer in the PIP screen without receiving a user command for selecting the PIP screen.

33. The television system according to claim 32, wherein the second image comprises a web page having a plurality of link items, and
in response to receiving the user input with the pointer positioned over one of the link items, another web page corresponding to the one of the link items selected via the received user input is displayed in the PIP screen.

34. The television system according to claim 32, wherein the first image comprises an image based on a receiving broadcasting signal, and the second image comprises a first web page browsed by a web browser, and
wherein when the pointer is located in a region having a predetermined web address on the first web page, a second web page corresponding to the predetermined web address is displayed in the PIP screen.

35. A display apparatus comprising:
a first signal processor which processes a first image signal;
a second signal processor which processes a second image signal;
a display unit which displays the processed first image signal in a first screen and displays the processed second image signal in a second screen, the first screen being partially overlapped by the second screen;
a receiver which receives a pointing signal corresponding to a pointer displayed on the display unit; and
a controller which determines whether the pointer is located on the first screen or the second screen, and when the controller determines that the pointer is located on the second screen, transmits the received pointing signal to the second signal processor.

36. The display apparatus according to claim 35, wherein the controller determines that the pointer is located on the second screen if the pointer is located in a region at least partially overlapping with a first image corresponding to the first image signal on the first screen.

37. The display apparatus according to claim 36, wherein the second signal processor processes a third image signal corresponding to a result from performing an operation corresponding to the location of the pointer on the second screen so the third image signal is adjusted to fit a predetermined size of the second screen according to an image adjustment performed by the second signal processor.

38. The display apparatus according to claim 37, wherein the image adjustment performed by the second signal processor comprises at least one of adjustment of display resolution and scaling.

39. The display apparatus according to claim 35, wherein the pointing signal is received from a pointing device connected to the receiver.

40. The display apparatus according to claim 35, further comprising a communication unit which communicates with an external device,
wherein the pointing signal is received from a pointing device connected to the external device.

41. The display apparatus according to claim 40, wherein the pointing device comprises at least one of a mouse, a touch pad, a touch screen provided on the display unit, a pointing remote controller and a keyboard.

42. The display apparatus according to claim 41, wherein the controller determines whether the pointer signal is received from the keyboard, and     if it is determined that the pointing signal is received from the keyboard, the controller assigns a key code corresponding to characteristics of the keyboard, generates a keyboard packet about a location of the pointer on the second image, and transmits the keyboard packet to the second signal processor.

43. The display apparatus according to claim 42, wherein if it is determined that the pointing signal is not received from the keyboard, the controller determines coordinates of the pointer on the second image, generates a packet about the coordinates, and transmits the packet to the second signal processor.

44. The display apparatus according to claim 39, wherein the pointing device comprises at least one of a mouse, a touch pad, a touch screen provided on the display unit, a pointing remote controller and a keyboard.

45. The display apparatus according to claim 44, wherein the controller determines whether the pointing signal is received from the keyboard, and     if it is determined that the pointing signal is received from the keyboard, the controller assigns a key code corresponding to characteristics of the keyboard, generates a keyboard packet about a location of the pointer on the second image, and transmits the keyboard packet to the second signal processor.

46. The display apparatus according to claim 45, wherein if it is determined that the pointing signal is not received from the keyboard, the controller determines coordinates of the pointer on the second image, generates a packet about the coordinates, and transmits the packet to the second signal processor.

\* \* \* \* \*